Sept. 19, 1967
R. G. NYSTROM
3,341,870
PORTABLE SPLICING TOOL
Filed Nov. 12, 1965
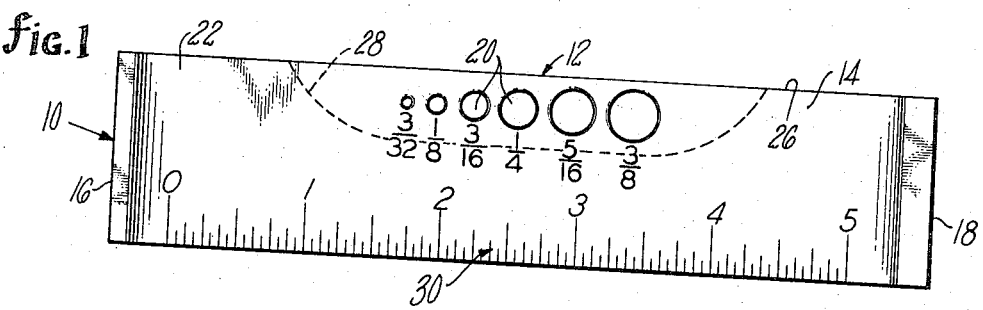
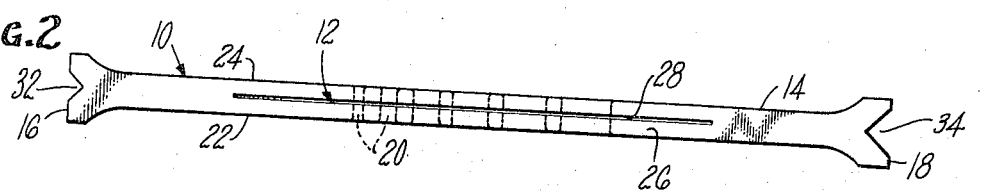
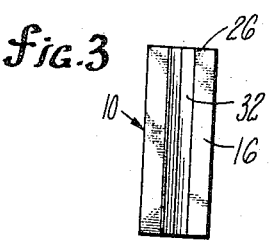
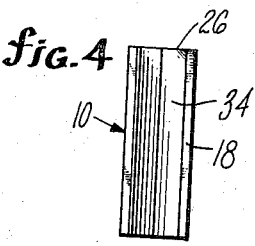
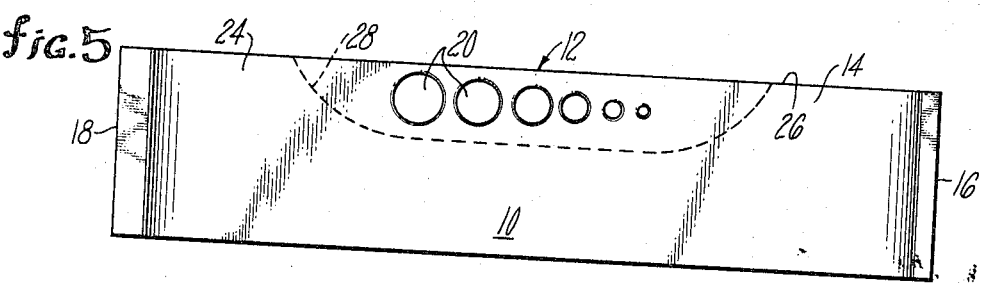
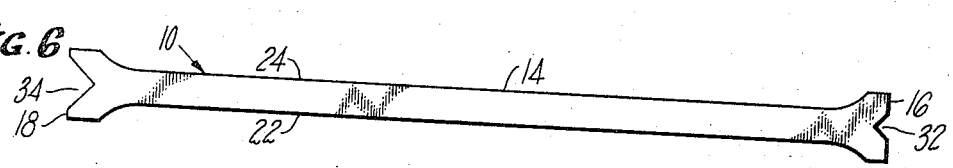
*INVENTOR.*
ROBERT G. NYSTROM
BY *Lindsey, Prutzman and Hayes*
ATTORNEYS

United States Patent Office 3,341,870
Patented Sept. 19, 1967

3,341,870
PORTABLE SPLICING TOOL
Robert G. Nystrom, Glastonbury, Conn., assignor to Loctite Corporation, Newington, Conn., a corporation of Connecticut
Filed Nov. 12, 1965, Ser. No. 507,477
2 Claims. (Cl. 7—17)

The present invention relates to a portable tool suitable for use in the splicing of rodlike materials. More particularly, it relates to a splicing tool for assisting in the rapid construction and repair of O-rings and the like.

It is an object of the present invention to provide a relatively small and handy portable splicing tool suitable for assisting in the rapid and accurate severing of flexible rodlike stock material and the quick and secure fabrication of rubber like O-rings therefrom.

Another object of the present invention is to provide a splicing hand tool of lightweight simple construction which is readily portable and occupies a minimum of space yet facilitates the accurate positioning of rodlike O-ring material during the splicing thereof.

Still another object of the present invention is to provide an easily operated, sleekly constructed splicing hand tool suitable for use in the construction and repair of O-rings which provides for the accurate measurement and severing of O-ring material as well as the accurate positioning of the severed material in a properly aligned abutting relationship on a smooth stable bonding platform for effectuating the secure attachment therebetween.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

FIG. 1 is a front elevational view of an embodiment of the hand tool of the present invention showing the indicia imprinted thereon;

FIG. 2 is a top view of the tool illustrated in FIG. 1;

FIGS. 3 and 4 are end views taken from the left and right sides, respectively, of the tool shown in FIGS. 1 and 2;

FIG. 5 is a back elevational view of the tool shown in FIG. 1; and

FIG. 6 is a bottom view of the tool as shown in FIG. 5.

Referring now to the drawing in greater detail and particularly to the embodiment illustrated therein, there is shown a portable splicing tool, generally indicated by the numeral 10, suitable for hand use and comprising a generally rectangular unitary member having a severing station 12 within its central portion and a pair of bonding stations located on the opposite ends thereof. The tool 10 comprises a thin, substantially straight and generally rectangular central body portion 14 of uniform thickness throughout its length and a pair of bifurcated end portions 16, 18 flared outwardly on both sides of the body portion 14. The tool is preferably no larger than a small pocket straightedge and is constructed of suitable lightweight yet durable materials. Plastics, such as polypropylene, have been found well suited for this purpose and are preferably employed due to the broad spectrum of properties obtainable therewith, chief among which are strength, flexibility and transparency.

The severing station 12 within the central body portion 14 is provided with a plurality of guide holes 20, extending entirely through the thin body from the front face 22 to the rear face 24 thereof. In the embodiment illustrated the holes 20 have their axes extending substantially perpendicular to the faces 22, 24 as well as to the general plane of the elongated body member 14 and their edges are tapered adjacent the faces 22, 24 so as to easily receive the rodlike rubber stock material. Each hole progressively differes in size from the hole immediately adjacent thereto and firmly supoprts the various O-ring forming materials of different diameter. Extending inwardly from the top edge 26 of the central body member 14 and bisecting each of the guide holes 20 at substantially a right angle thereto is a narrow slot 28 suitable for receiving a cutting blade. The slot 28 terminates at a point well beyond and below the holes 20 thereby ensuring the complete severence of the rodlike O-ring material supported within the holes during the severing operation.

As illustrated, the front face 22 of the tool 10 contains a graduated scale, generally designated 30, which permits accurate measurement of the amount of rodlike material necessary for forming a particular O-ring of the desired size. Also, indicia are provided adjacent each of the holes 20 for indicating the diameter of the rod best suited for support by that particular hole.

The outwardly flared bonding stations located in the end portions 16, 18 of the unitary member 10 are substantially identical in construction although somewhat different in size. The end portions are each provided with V-shaped grooves 32, 34, respectively, which as shown are substantially straight, smooth areas extending from the top 26 of the tool to the bottom thereof. Each groove exhibits an included angle of approximately 90°; although, as mentioned hereinbefore, the groove 34 is somewhat larger so as to accommodate the larger diameter rubber stock material.

In operation the proper length of rubber rodlike stock can be easily measured on the scale 30 and cut to the proper length by insertion into the properly sized guide hole 20 wherein it is firmly supported during the severing operation. The latter is accomplished by passing a cutting blade through the slot 28 past the supporting hole 20. The precisely cut rod is then removed and a quick hardening rubber cement, adhesive or other bonding agent, such as neoprene cement, is applied to the ends thereof. The ends are placed in aligned abutting relationship within the properly sized groove 32 or 34 and held therein for a short time during the hardening of the bonding agent.

As can be appreciated from the foregoing description, the splicing tool of the present invention provides a simple and easily operated cutting and bonding aid which facilitates the quick fabrication of O-rings and the like. Being of pocket size it can be easily carried from job to job and can be used in a facile and rapid manner to assure the proper and accurate fabrication of the properly sized O-rings.

As will be apparent to persons skilled in the art, various modifications and adaptations of the structure above-described will become readily apparent without departure from the spirit and scope of the invention, the scope of which is defined in the appended claims.

I claim:
1. A portable rod splicing hand tool suitable for use in construction and repair of O-rings, comprising a thin, elongated central body member having a rod severing station and at least one rod bonding station integral therewith, said severing station having as support means a plurality of guide holes of progressively different sizes extending therethrough for receiving rod material corresponding to the size of the hole and a narrow slot extending from one edge of said central body member and bisecting each of said holes, said slot being of sufficient width to permit the insertion therein of a cutting blade for severing the rod material within the guide hole, and each rod bonding station containing a V-shaped groove, said groove being substantially straight to permit the aligned end-to-end placement of the rod material therein during the joining thereof.

2. The hand tool of claim 1 which has two rod bonding stations, the V-shaped grooves of said bonding stations being of different depth and each having an included angle of about 90°.

References Cited

UNITED STATES PATENTS

| | | | |
|---|---|---|---|
| 3,026,569 | 3/1962 | Keller | 156—158 X |
| 3,156,338 | 11/1964 | Ploeger | 156—159 X |
| 3,257,725 | 6/1966 | Dignard | 30—290 |

WILLIAM FELDMAN, *Primary Examiner.*

R. V. PARKER, Jr., *Assistant Examiner.*